United States Patent [19]
Tully

[11] Patent Number: 6,070,626
[45] Date of Patent: Jun. 6, 2000

[54] ROUTER ATTACHMENT

[76] Inventor: Roger Tully, 41 Cortright Rd., Whippany, N.J. 07981

[21] Appl. No.: 09/352,975

[22] Filed: Jul. 14, 1999

[51] Int. Cl.[7] .............................. B27C 9/00; B27C 5/00; B27M 1/00
[52] U.S. Cl. ................ 144/48.6; 144/154.5; 144/137; 409/180; 409/182
[58] Field of Search ............................ 144/48.6, 136.95, 144/135.2, 137, 154.5; 409/180–182

[56] References Cited

U.S. PATENT DOCUMENTS

| | | |
|---|---|---|
| 4,615,654 | 10/1986 | Shaw . |
| 4,718,468 | 1/1988 | Cowman . |
| 4,942,912 | 7/1990 | Gakhar et al. . |
| 5,289,861 | 3/1994 | Hedrick . |
| 5,657,804 | 8/1997 | Lee ........................................ 144/154.5 |
| 5,722,368 | 6/1998 | Posh . |

*Primary Examiner*—W. Donald Bray
*Attorney, Agent, or Firm*—Buchanan Ingersoll, P.C.

[57] ABSTRACT

A three-in-one router accessory tool is provided. A router stabilizer base, fixed fence and floating fence can be used in various combinations to enhance the capabilities of the router. The router attachment aids the operator in finishing or smoothing wood pieces and can also be used as a biscuit slot cutter, obviating the need to purchase specialized wood working tools.

5 Claims, 2 Drawing Sheets

ROUTER ATTACHMENT

BACKGROUND OF THE INVENTION

1. Field of the Invention

The invention relates to a router attachment accessory, and more particularly to a combination router stabilizer base, fence and biscuit slot cutter.

2. Description of the Prior Art

A router can be a very versatile woodworking tool, in that it can perform many functions. From simple contouring pieces of wood to machining out grooves and other decorative features in the surface of wood and/or countertop materials, a router having the appropriate bits and attachments can be a handy woodworking tool. Many router attachments are provided by either the router manufacturer or other tool makers which can be individually mounted to the router to perform these varied functions. For example, a base can be provided for the router to aid the user in performing such functions as rounding over what would be sharp edges of a piece of wood or countertop material. Moreover, a fence can be provided in order to guide the router around the edges of these work pieces to help insure consistent edges, or to plane an edge, or to smooth, rough or uneven ends. Another attachment which can be provided is a biscuit cutter attachment. This attachment allows the router to be used to cut openings or slots in the edges of two pieces of wood which are to be joined by a biscuit, to provide a strong glued joint between the two wood pieces in a side by side manner. Alternatively, individual specialized tools can be purchased to perform these operations.

Although each of these tools may be provided separately by different manufacturers, each requires the purchase of the separate attachments individually. It is desirable to have a single attachment which can perform all of these functions in order to minimize cost and complexity of mounting the accessory to the router body.

It is therefore an object of the present invention to provide a versatile mechanism capable of performing several functions in combination with a router to perform finishing work.

It is another object of the present invention to provide a router attachment which can perform functions of a biscuit slot cutter as well as a stabilizer base or fence for rounding over, cutting or planing work pieces.

It is the objective of the invention described herein to provide a router attachment which will permit the router to be used more effectively and efficiently by the router operator.

SUMMARY OF THE INVENTION

The above objectives are attained by the present invention, according to which, briefly stated, a router attachment provides a stabilizer base and/or fence for providing decorative finishes or smoothing wood pieces, and can also be used as a biscuit slot cutter to join two pieces of wood together in a side by side fashion. The router attachment comprises three interchangeable parts which can be reconfigured in several different configurations and arrangement of parts in order to perform the various functions.

The present invention expands the versatility of a router by providing use in four unique functions. Comprised of a base, affixed to the bottom of the router, and a fixed and floating fence, the tool is able to complete additional tasks normally executed with individual tools or multiple attachments to the router.

First the base component provides stability to the router by expanding the tool's glide surface. Chances of tipping or veering off-course are dramatically reduced, and consequently the accuracy of the wood working process is improved.

Second, by adding the "fixed fence" to the base, the router is able to be guided along the side of a surface and the blade is prevented from gouging. An example of the base and fixed fence use is in the fine finishing of counter top edges where the top meets the side at a 90 degree angle. The router is used to plane and finish the edge to provide a smooth, seamless appearance. Further application may be found in cutting grooves on the side of a counter for the attachment of laminate with tongue and groove application or scrolling wood. The fixed fence provides greater versatility in wood working designs created by the router when used with a wide range of bits by controlling the depth of the cut.

Third, the fixed fence with adjustable depth capabilities, allows the router to be used as a planer for use in creating a straight edge. The fence used with a "straight flute" bit allow the user to plane a surface such as the bottom of a door or the edge of a board. By reversing the surface to be planed, cuts of approximately two inches may be straightened, and larger surfaces could be planed were the manufacturer to provide longer bits.

Fourth, by adding the floating fence to the fixed fence and the base, the user is able to cut biscuit slits which are used to bond wood and create wider boards with the strength of a solid piece. Further, biscuits are used to attach decorative material to wood and furniture. The floating fence allows the user to make exact slot cuts, and eliminates the chance of error. It is adjustable to accommodate different sized biscuits which may be purchased in several widths. Without the benefit of "friction" inherent with the use of a fence as it is pressed against the surface, the torque of the router has a tendency to pull the machine in the direction which the bit spins, increasing the chances of misalignment between the slots cut for the biscuit on both pieces being attached.

In summary, the present invention provides four functions to the average router, expanding its use efficiently and effectively by providing a base to stabilize the tool, a fence to guide the wood worker in executing finish designs or to make the router work as a planer, and a retractable fence to allow the user to complete the biscuit installation function. And, if tools were acquired to complete the biscuit and planing functions together with a router, costs in excess of $300 would be experienced. Conversely, the present invention can provide an efficient and versatile way to satisfy multiple needs at less than half of the cost of router attachments and approximately 10% of the charge for separate tools.

BRIEF DESCRIPTION OF THE DRAWINGS

Various other objects, features and advantages of the invention will become more apparent by reading the following detailed description in conjunction with the drawings, which are shown by way of example only, wherein.

DETAILED DESCRIPTION OF THE PREFERRED EMBODIMENTS

Figure 1:
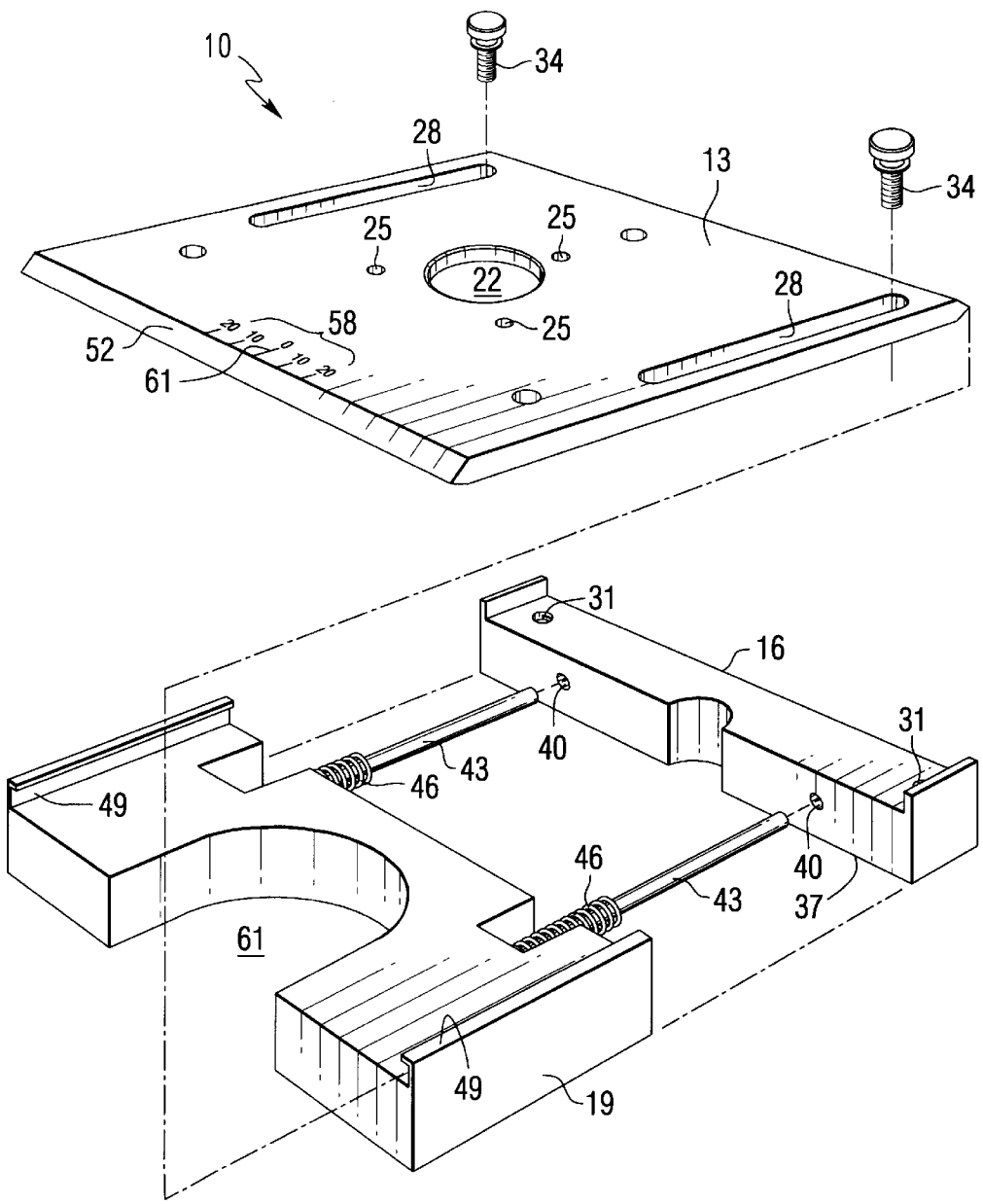
FIG. 1 is an exploded view of a router attachment of the present invention showing the various pieces and their interchangability.
Figure 2:
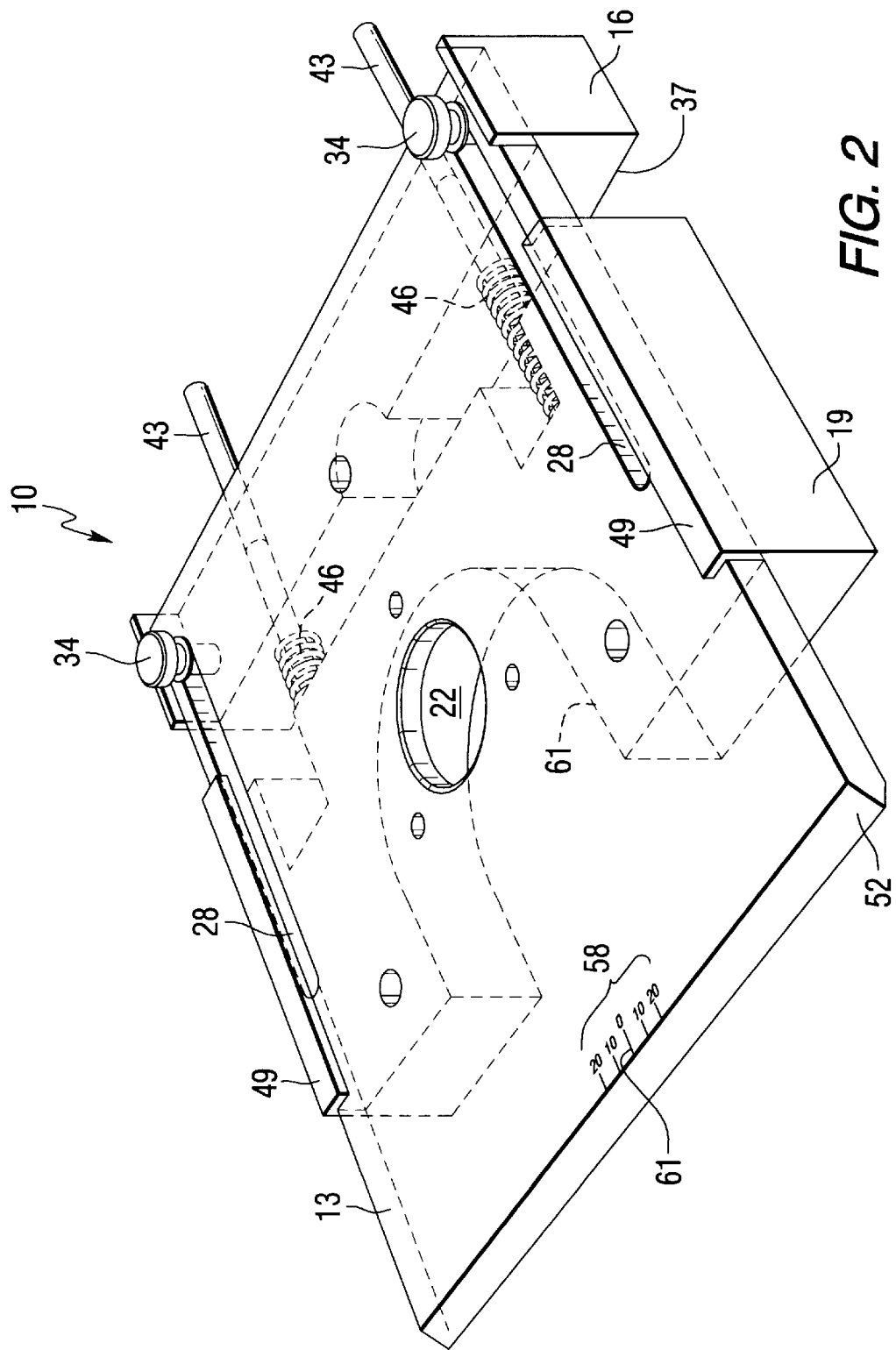
FIG. 2 shows a top perspective view of the router attachment of the present invention configured to perform the functions of a biscuit slot cutter.

Referring now to the drawings in detail, wherein like reference characters refer to like elements throughout the various figures, a router enhancer 10 of the present invention is shown, which comprises a three in one tool to improve the versatility of the router. The router enhancer 10 shown in FIG. 1 is comprised of three basic components: stabilizer base 13, fixed fence 16 and floating fence 19. The stabilizer base provides stability for the router in typical surface uses. By expanding the router's glide surface with respect to the work piece, the chances of the router tipping or veering off course from the work piece can be significantly reduced. Accuracy and consistency in the work piece machining process is improved and the chance for error minimized. Typically, the stabilizer base 13 can be used in rounding over what would otherwise be sharp corners of a work piece, such as a piece of wood or countertop. It can also be used when machining decorative end pieces directly on the work piece or to be attached to its edge. The stabilizer base 13 includes an opening 22 through which the router bit passes to contact the work piece. Three holes 25 are provided adjacent the opening for attaching the stabilizer base 13 to the router, in a manner well known in the art. This first set of attachment holes 25 allows the router enhancer 10 to be attached to the router bottom surface or sheath. Also as shown in FIG. 1, the stabilizer base 13 includes a second set of holes 26 for an alternate means of attaching the router enhancer 10 to a router having a wider base.

The fixed fence 16 can also be added, which is attached to the stabilizer base to enable the router to be guided along the side of the work piece surface and thereby prevent the blade from gouging the work piece edge. The stabilizer base includes a pair of generally parallel slots 28, which are aligned with threaded holes 31 in the fixed fence 16. In one embodiment, threaded inserts can be secured in the fixed fence holes and are threadingly engaged by bolts 34 which secure the stabilizer base 13 to the fixed fence 16. It will be appreciated by those skilled in the art that other securing means can be used, such as a bolt which passes through the fixed fence and have threaded on its end a nut which engages the bottom surface 37 of the fixed fence 16.

The slots 28 enable the router bit to be separated from the fixed fence 16 a variable distance, depending on the spacing from the work piece edge it is desired to perform the desired routing. Moreover, the stabilizer base 13 can be attached to the fixed fence 16 in an opposite orientation to configure the router with respect to the fixed fence in a variety of manners. Additionally the stabilizer base can be made larger and/or have longer slots to provide increased adjustability. One example of the use of the stabilizer base and fixed fence in combination is the fine finishing of countertop edges where a top piece meets a side piece at a 90° angle. The mating edge is "planed" by the router, which is provided with the appropriate router bit, to remove the sharp edge. The fixed fence 16 and stabilizer base 13 combination can also be used in cutting grooves in the side of a counter for the application of laminate with tongue and groove structure or recess woodwork. This would enable a groove to be cut along the length of a side surface of a work piece in order that a tongue from a mating piece can be fit within the groove in order to provide a secure attachment such as by adding an appropriate adhesive at the joint.

By the addition of a floating fence 19 to the fixed fence 16 and the stabilizer base 13, a router operator can use the router in a manner to cut biscuit slots in the work piece edge, which can be used to bond wood pieces in a side by side fashion, thereby providing the strength of one piece. Biscuits can also be used to join a decorative end piece to the end surface of a work piece. The fixed fence 16 includes a second pair of holes 40, generally oriented perpendicular to the threaded insert holes 31 for attaching the stabilizer base 13. These second holes 40 accept rods 43 which are secured to the floating fence 19. Preferably, springs 46 are placed on the rods 43 between the fixed fence and the floating fence as will be more fully explained hereafter. The floating fence 19 preferably includes parallel channels 49 on each of its lateral edges for guiding the stabilizer base 13. Preferably, the front edge 52 of the stabilizer base is slanted to more easily insert the stabilizer base into the channels. Clips or other means (not shown) secure the rods 43 to the fixed fence 16.

The router is attached to the stabilizer base and the floating fence is abutted up against the face of the work piece which is to have the biscuit slot cut. The bottom surface of the stabilizer base therefore rests on the top surface of the work piece and the router is in position to cut the biscuit slot in the work piece. On the top surface of the stabilizer base is a biscuit cutter guide 58, which enables the user to determine to cut the appropriate size slot in the work piece for one of three basic biscuit sizes. A center line 61, designated "0" and corresponding to the first biscuit size, is provided in the center of the stabilizer base and has on either side thereof markings indicating the two biscuit sizes. An operator need only fix the center line 61 with a biscuit center line marked on the work piece and push the router up against the surface of the work piece. Due to the spring loaded mechanism 46 between the fixed fence 16 and the floating fence 19, the operator need only push the router forward against the surface of the work piece thereby causing the fixed fence attached to the router to move therewith and into contact with the back of the floating fence which abuts the side of the workpiece. For the two larger biscuit sizes, the operator need only move the router and the router enhancer 10 from side to side such that the marking according to the appropriate biscuit size is thus aligned with the center of the work piece, thereby indicating that the one half of the biscuit slot has been cut and then need only move the router to the opposite side such that the other indicator marking on the stabilizer base 10 is aligned with the center line to ensure that the appropriate size slot is cut into the face of the work piece. In this configuration, the router bit (not shown) passes through the opening 22 and is generally disposed in the area of a cut-out 64 provided in the floating fence 13. The operator need only perform this simple function for each of the other biscuit locations in the work piece.

While specific embodiments in the invention have been described in detail, it will be appreciated by those skilled in the art that various modifications and alterations would develop in light of the overall teachings of the disclosure. Accordingly, the particular arrangements disclosed are meant to be illustrative only and not limiting as to the scope of the invention which is to be given the full breadth of the appended claims and in any and all equivalents thereof.

What is claimed is:

1. A router accessory comprising:
    a stabilizer base having a top surface and a bottom surface, the top surface being attachable to a router bottom, the stabilizer base having a pair of parallel slots disposed on either side thereof and an opening for a router bit such that the bottom surface of the stabilizer base is adapted to rest on a top surface of a work piece;
    a fixed fence;
    means for attaching the fixed fence to the bottom surface of the stabilizer base, said means for attaching passing through said parallel slots such that the stabilizer base is adjustable with respect to the fixed fence; and
    a floating fence slidably mounted to the fixed fence adjacent the surface of the stabilizer base, the floating fence having a cut-out for passage of the router bit.

2. The router accessory of claim 1, wherein said means for attaching the fixed fence comprises a pair of threaded inserts, wherein the fixed fence includes a pair of threaded holes which are aligned with said parallel slots of the stabilizer base, such that each of said threaded inserts passes through each of said parallel slots to threadingly engage said threaded hole in the fixed fence, whereby the stabilizer base is adjustably secured to the fixed fence.

3. The router accessory of claim 2, wherein the floating fence includes a pair of rods generally oriented perpendicularly to said parallel slots, said rods passing through corresponding hole in said fixed fence for slidably mounting the floating fence to the fixed fence.

4. The router accessory of claim 3, further including a pair of springs, each of said springs mounted to each of said rods so as to be disposed between the floating fence and the fixed fence.

5. The router accessory of claim 1, wherein the stabilizer base includes a biscuit cutter guide on the top surface thereof on an end opposite the fixed fence.

\* \* \* \* \*